J. R. SNYDER.
FLEXIBLE PIPE JOINT.
APPLICATION FILED JUNE 7, 1918.
1,286,819.
Patented Dec. 3, 1918.
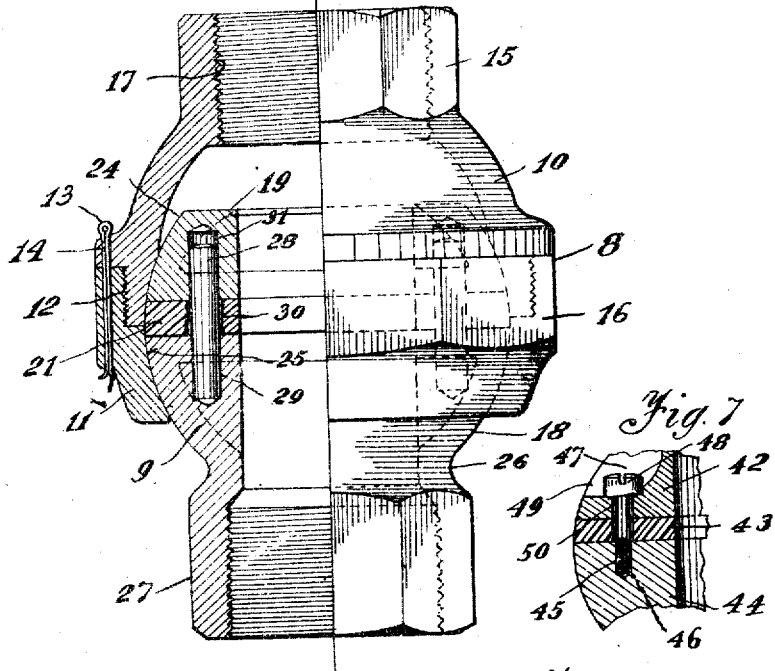
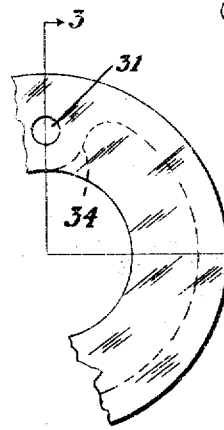
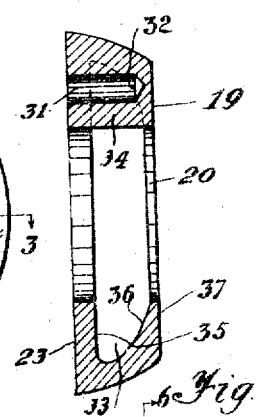
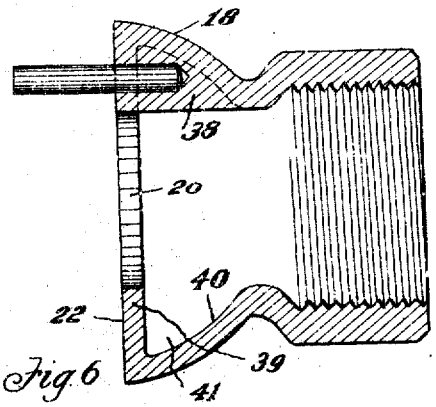
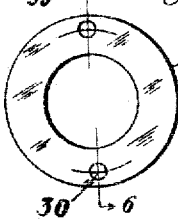
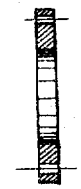
WITNESS
INVENTOR.
James R. Snyder

UNITED STATES PATENT OFFICE.

JAMES R. SNYDER, OF WILKINSBURG, PENNSYLVANIA.

FLEXIBLE PIPE-JOINT.

1,286,819.  Specification of Letters Patent.  Patented Dec. 3, 1918.

Application filed June 7, 1918. Serial No. 238,775.

*To all whom it may concern:*

Be it known that I, JAMES R. SNYDER, a citizen of the United States, residing at Wilkinsburg, in the county of Allegheny and State of Pennsylvania, have invented certain new and useful Improvements in Flexible Pipe-Joints, of which the following is a specification.

This invention relates to improvements in flexible pipe joints or couplings and particularly to that type of flexible joints commonly known as the "ball and socket" joints.

The primary object of this invention is to provide a flexible joint or coupling of the character herein described of the novel construction which is automatically operable to be self-tightening by the action, pressure or suction of the fluid in and through the joint or coupling.

Another important object of this invention is to provide a joint of the type set forth, wherein the pressure of the fluid, in its passage through the joint, will act directly against the flexible member or gasket in the ball member of the joint.

Further objects of this invention are to provide a device of the class specified which is simple in its construction and arrangement, strong, durable and efficient in its use, readily installed or connected in a pipe line, and comparatively inexpensive to manufacture.

To the accomplishment of these and such other objects as may hereinafter appear, the invention consists of the novel construction, combination and arrangement of parts herein specifically described, and illustrated in the accompanying drawing, wherein is shown an embodiment of the invention.

In the drawing forming a portion of this specification and wherein like numerals of reference designate corresponding parts throughout the several views:

Figure 1 is a side elevation of an improved flexible pipe joint, embodying the invention, with the half thereof in cross-section.

Fig. 2 is a face view of the ball section or follower with a portion thereof broken away.

Fig. 3 is a cross sectional view of the follower on the line 3—3, Fig. 2.

Fig. 4 is a cross sectional view of the ball member.

Fig. 5 is a face view of the flexible member or gasket.

Fig. 6 is a cross sectional view thereof on line 6—6, Fig. 5.

Fig. 7 is a fragmentary cross sectional view of a modification of the ball construction.

Referring more in detail to the drawing, there is shown in Fig. 1, an improved flexible pipe joint, embodying the invention, and comprising the casing 8 and the ball 9. The casing 8 consists of the socket member 10 and the socket nut 11, which have a screw threaded connection 12 with each other. The casing 8 does not differ materially from the casings used in connection with ball and socket joints now on the market.

The only departure from the construction of the casings now commonly used, is the provision of the locking means to prevent the loosening of the socket nut 11 on the socket member 10, which may result from the constant oscillatory or rotary movements of the ball 9 within the casing 8 associated with very hard and heavy service. This locking means consists of a cotter pin 13 which engages both the socket member 10 and the socket nut 11 when it is inserted through the aperture 14, which is drilled in the casing 8 after the joint is assembled. Various other means for locking the casing members can be employed but the arrangement embodied in the invention has proven the most feasible and satisfactory in actual service.

The socket member 10 and the socket nut 11 are pertinently provided with the flats 15 and 16, respectively, adapted for engagement of a tool or wrench for connecting or disconnecting the joint in the pipe line. While illustrating the socket member 10 provided with a female threaded end 17 for threaded pipe end engagement, it will be obvious that a male threaded end may be employed if desired.

The ball 9 comprises the ball member 18 and the complemental ball section, which will hereinafter be designated the follower 19, and is provided with the bore 20 commensurate in diameter to the diameter of the pipe to which the joint is adapted to be connected.

A preferably flexible resilient member or gasket 21 is positioned intermediate the face 22 of the ball member 18 and the face 23 of the follower 19 and extends from the bore 20 to the periphery 24 of the ball 9.

The periphery 24 of the ball 9, formed by the combination of the ball member 18, the gasket 21 and the follower 19, is spherical in contour at all points where it comes in contact with the socket or ball seat 25 which is formed by the assembly of the casing 8. The ball 9 is free to frictional rotation in the ball seat 25, of the casing 8, but the oscillatory or angular movements of the ball are restricted by contact of the neck 26, of the ball member 18, with the socket nut 11. The neck 26 connects the female threaded end 27 with the ball member 18, all of which are formed integrally. If desired the ball member 18 may be formed with a male threaded end, depending only on what pipe connection is to be made thereto.

Pins 28 are securely fixed in apertures 29 in the face 22 of the ball member 18 and pass through the apertures 30 in the gasket 21 and are slidably engaged in the apertures 31 in the face 23 of the follower 19.

The pins 28 are not of sufficient length to extend to the bottoms 32 of the apertures 31, in the follower 19, thus permitting the pressure or suction of the fluid passing through the joint to force the follower 19 against the gasket 21, the periphery of which will necessarily expand against the ball seat 25 making any possible passage therethrough absolutely impervious.

The purpose of the pins 28 is to keep all of the parts, which compose the ball 9, in perfect alinement and synchronize their movement within the casing 8.

If desired the pins 28 may be fixed in the apertures 31, in the follower 19, and have a sliding engagement in the apertures 29 in the ball member 18, or they may also be constructed to have a sliding engagement in the apertures 29 and 31 in both the follower 19 and the ball member 18.

The operation of the different constructions and arrangements of the pins 28, whether carried by the ball member 18 or by the follower 19 or slidably engaging both, is identical, and the only objects in preferring them fixed in one of the members being, to form the ball 9 as nearly integral as feasible and to augment the simultaneity of movement of the various parts comprising the ball.

While in the embodiment of the invention shown in the drawing but two pins 28 are used, it will be apparent that a plurality of pins may be successfully employed especially in the larger sized pipe joints of this construction.

The follower 19 is provided with the cavity or recess 33 opening inwardly toward the bore of the follower 19 and extending circumferentially all around the bore with the exception of the portions 34 into which extend the apertures 31 for the purpose hereinbefore described.

The wall 35 of the recess 33 is constructed to extend parallel to the face 23 of the follower 19 and the wall 36 of the recess to extend parallel to the periphery of the follower 19.

The construction of the recess 33 into follower 19 will subject the parallel wall 35 to the pressure of the fluid within the joint in addition to the pressure already exerted to the nose 37 of the follower 19.

As it is primarily essential for the successful operation of the joint, that the ball 9 be so constructed and arranged, that the periphery of the gasket 21 will be expanded against the ball seat 25 in the casing 8, the advantages of the construction of the follower 19 in conjunction with the sliding fit of the periphery 24 of the ball 9 in the ball seat 25 in the casing 8, and the arrangement of the gasket 21 which extends from the periphery of the ball 9 to the bore 20 where it is subjected to the pressure of the fluid, will be readily apparent.

The ball member 18 is also provided with the recess 41 which extends circumferentially all around the bore 20 with the exception of the portions 38 through which extend the apertures 29 for the reason hereinbefore described. The wall 39 of the recess 41 is arranged parallel to the face 22 of the ball member 18 and the wall 40 parallel to the periphery 24 of the ball.

No direct pressure is exerted by the fluid to the ball 9 by the recess 41 in the ball member 18, but is of advantage by the saving of material in ball construction and uniformity in construction of the ball sections is adhered to and maintained.

The gasket 21 positioned flatly intermediate of the faces 22 and 23 of the ball member 18 and the follower 19, respectively, is constructed from a suitable flexible material, such as rubber or equivalent composition to meet conditions met with in practice, so as to respond to and expand under pressure. The apertures 30 in the gasket 21 are provided for the passage of the pins 28 for the purpose herein before described.

In the modification shown in Fig. 7 of the drawing, the follower 42 is attached through the gasket 43 to the ball member 44 by the tap bolts 45 which engage the threaded apertures 46 in ball member 44. The follower 42 is provided with the recesses 47 for the reception of the heads 48 of the tap bolts 45 so that the heads 48 will not extend beyond the periphery 49 of the ball and interfere with the movement of the ball when seated in the casing. The follower 42 is slidably engaged by the tap bolts 45 in the apertures 50 and its operation is apparent and similar to that shown and described in the preferred form.

While the modification of the joint shown and described is of a more expensive manufacture than the preferred form, it will permit a more permanent assembly of the ball unit with less liability of the loss of parts in the process of manufacture and transportation.

From the foregoing description, taken in connection with the accompanying drawing, the advantages of the construction and the method of operation will be readily apparent to those skilled in the art to which the invention appertains, and while describing the principle of operation of the invention together with the device which is now considered to be the best embodiment thereof, it is to be understood that the device shown is merely illustrative and that various changes in the form, proportion and the minor details of construction may be resorted to without departing from the principle or sacrificing any of the advantages of the invention as defined in the appended claims.

Having described the invention what I claim as new and desire to secure by Letters Patent is:

1. A flexible pipe joint comprising a casing, a ball member movably mounted therein, a follower having a sliding pin connection with the said ball member, and a gasket arranged between the said follower and the said ball member.

2. A flexible pipe joint comprising a casing, a ball member movably mounted therein, a follower, a gasket arranged therewith and with the ball member, and pins projecting from the said ball member and slidably engaging the said follower.

3. A flexible pipe joint comprising a casing, a ball member movably mounted therein, a follower, a gasket arranged between the said ball member and the said follower, and pins extending through the said gasket and slidably engaging the said ball member and the said follower.

4. A flexible pipe joint comprising a socket member, a ball mounted therein, a socket nut having a screw threaded engagement with the socket member for holding the ball member within the socket member, a follower, a slidable pin connection between the follower and the ball member, and a gasket arranged between the follower and the ball member and having a portion of its surface subject to the pressure within the joint.

5. A coupling comprising a socket member, a ball member mounted therein, a socket nut having screw threaded engagement with the socket member for holding the ball member within the socket member, a follower, a slidable pin connection between the follower and the ball member, and a gasket arranged between the said follower and the said ball member, the bore of said follower, ball member and gasket being of equal diameter with the walls thereof subject to the pressure within the coupling.

6. A coupling comprising a socket member, a ball member mounted therein, a socket nut having screw threaded engagement with the socket member for holding the ball member within the socket member, a follower, a slidable pin connection between the follower and the ball member, and a gasket arranged between the follower and the ball member, the bore of the said follower, ball member and gasket being of equal diameter with the walls thereof subject to the pressure within the coupling, said follower and ball member being further provided with a recess one wall of which being arranged parallel to the gasket for the purpose set forth.

7. A pipe coupling comprising a socket member, a ball member, a socket nut, having a swivel connection with the ball member and screw threaded engagement with the socket member, a gasket arranged in flat engagement with the face of the ball member and provided with openings, pins projecting from the face of the said ball member and passing through the said openings, and a follower slidably guided by the pins and having a flat face arranged in flat engagement with the gasket and further mounted for pivotal movement within the socket member, said gasket having the wall of its bore arranged to be subject to the pressure within the coupling.

8. A pipe coupling comprising a casing, a ball member having a swivel connection with the said casing, a follower, a gasket arranged between the said ball member and the said follower, and bolts slidably engaging the said follower and having a screw threaded engagement with the said ball member.

9. A coupling comprising a socket member, a ball member swivelly mounted therein, a socket nut having a screw threaded engagement with the socket member for holding the said ball member within the said socket member, a follower, a slidable pin connection between the said follower and the said ball member, a gasket arranged between the said follower and the said ball member, and means for locking the said socket nut upon the said socket member.

10. A flexible pipe coupling comprising a casing, a ball member swivelly mounted therein, a follower, a gasket arranged between the said follower and the said ball member, and pins projecting from the said follower and slidably engaging the said ball member.

11. A flexible pipe coupling comprising a casing, a ball member swivelly mounted therein, a follower, a flexible member arranged between the said follower and the said ball member, pins extending through the said flexible member and slidably engaging the said follower and the said ball member, and a cotter pin for locking the said casing on said ball member.

In testimony whereof, I affix my signature in the presence of two witnesses.

JAMES R. SNYDER.

Witnesses:
 JENNIE JONES,
 HENRY G. GILES.